United States Patent

Asmar et al.

[11] 3,948,107
[45] Apr. 6, 1976

[54] VELOCITY TRANSDUCER

[75] Inventors: Romeal F. Asmar, Concord; Harold D. Morris, Orinda, both of Calif.

[73] Assignee: Systron Donner Corporation, Concord, Calif.

[22] Filed: July 31, 1973

[21] Appl. No.: 384,240

[52] U.S. Cl. ............................. 73/503; 73/516 LM
[51] Int. Cl.² ..................... G01P 15/08; G01P 7/00
[58] Field of Search ............. 73/503, 505, 516 LM

[56] References Cited
UNITED STATES PATENTS

| | | | |
|---|---|---|---|
| 3,038,344 | 6/1962 | Statham | 73/516 LM X |
| 3,520,196 | 7/1970 | Morris et al. | 73/516 LM |
| 3,682,003 | 8/1972 | Sage et al. | 73/503 |

*Primary Examiner*—James J. Gill
*Attorney, Agent, or Firm*—Flehr, Hohbach, Test, Albritton & Herbert

[57] ABSTRACT

A velocity sensor which may be modified to perform a sensing function for either angular velocity or linear velocity. The sensor has a base member which is split into upper and lower halves which are shaped to form internal walls defining an internal channel when joined together. A fluid is disposed in the internal channel and a paddle member is placed in communication with the fluid. Sensing means are present to detect the position of the paddle member as it is urged into motion by the inertia of the fluid mass in the angular embodiment and by the inertia of the paddle member in the linear. An electrical output is provided which is related to the urge to move imparted to the paddle member. The output is used to electrically restrain the motion of the paddle member. The output related to paddle member motion is also integrated to provide a signal related to velocity. Saturation of the integrated output unrelated to velocity is prevented by additional electrical means. AC input, DC internal operation, and AC output is provided as well as fast automatic nulling after application of power, self test means and an inhibited output in the event of electrical failure within the unit. The fluid mass flow path being integral with the base member substantially eliminates thermal gradients within the fluid mass, removing error arising from fluid flow due to thermal gradients. Linear acceleration sensitivity in the angular velocity sensor embodiment is eliminated by paddle member balance about the pivot axis within the fluid mass during assembly. Pivot stabilization during shock and vibration loads is provided by adjustable leaf spring supports disposed between the paddle and the base member. The AC output phase shift relative to the AC input is substantially eliminated over the operational temperature range as compared with conventional instruments of this type.

26 Claims, 7 Drawing Figures

VELOCITY TRANSDUCER

BACKGROUND OF THE INVENTION

This invention relates to an improved velocity transducer and more particularly to an angular velocity transducer for use in applications generally utilizing spinning rotor rate gyros.

Errors have been experienced in the past in fluid filled instruments when thermal gradients are created within the fluid mass. A slight variation in density results throughout the fluid mass which when subjected to acceleration causes thermal currents to flow within the fluid mass. Internal forces from the thermally induced currents produce motion of internal moving members resulting in output in the absence of the normal input stimulus. External magnetic fields may also interact with the internal construction of a transducer producing output in the absence of the normal input stimulus. In shock and vibration environments, moving member motion in a preferred direction, normally referred to as rectification, may occur unless the moving member is effectively isolated from the instrument mounting base when it is subjected to such environments. Further errors may arise in an angular sensor if the moving member is not perfectly balanced about the pivot axis. The summation of these errors is generally much greater than tolerable system error. There is, therefore, a need for a velocity sensor for use in linear and angular velocity measurement applications, which is free from the errors induced by internal thermal gradients, external magnetic fields, external shock and vibration environments, and, in the case of angular transducers, imbalance about the pivot axis of the moving member.

SUMMARY AND OBJECTS OF THE INVENTION

A velocity transducer having a base member which is separable, with internal walls forming an internal closed channel when assembled. A fluid mass is disposed within the closed channel. A paddle assembly is pivotally mounted relative to the base member having a paddle member extending into the closed channel with the broad surfaces of the paddle member obstructing flow of the fluid mass through the channel. Electrical means are provided for retaining the paddle assembly in a predetermined position relative to the base member and for providing an electrical output related to movement of the paddle member. A return path for magnetic flux completely surrounds the means for retaining the paddle assembly serving to complete the magnetic circuit therein and to shield the assembly from induced electrical noise in the output caused by stray magnetic flux. An integrator receives the output providing an integrated output related to velocity of the base member relative to a predetermined axis. Means are provided in the integrator for preventing saturation of the integrator output in the absence of velocity applied to the base member. The integrated output has a pass band limited at the high frequency end by the sensing assembly mechanical response and the electrical characteristics of the output circuit. The pass band is limited at the low frequency end by the electrical characteristics of the integrator. Leaf spring pivot supports are disposed between the paddle assembly and the base member for stabilizing the paddle member during shock and vibration environments applied to the base member.

In general, it is an object of the present invention to provide a velocity transducer substantially free from errors due to internal thermal gradients, external flux field effects, or externally applied shock vibration.

Another object of the present invention is to provide a velocity transducer which may be modified to sense either linear or angular velocity.

Another object of the present invention is to provide a velocity transducer which senses angular velocity and which is substantially insensitive to linear velocity.

Another object of the present invention is to provide a velocity transducer which is operational substantially immediately after application of power.

Another object of the present invention is to provide a velocity transducer utilizing AC power input and providing AC signal output with substantially no output phase error referenced to the input over the operating temperature range.

Another object of the present invention is to provide a velocity transducer having self test features.

Another object of the invention is to provide a velocity transducer which provides inhibited output following electrical failure modes.

Additional objects and features of the invention will appear from the following description of which the preferred embodiment has been set forth in detail in conjunction with the accompanying drawings.

DETAILED DESCRIPTION OF THE PREFERRED EMBODIMENT

Figure 1:
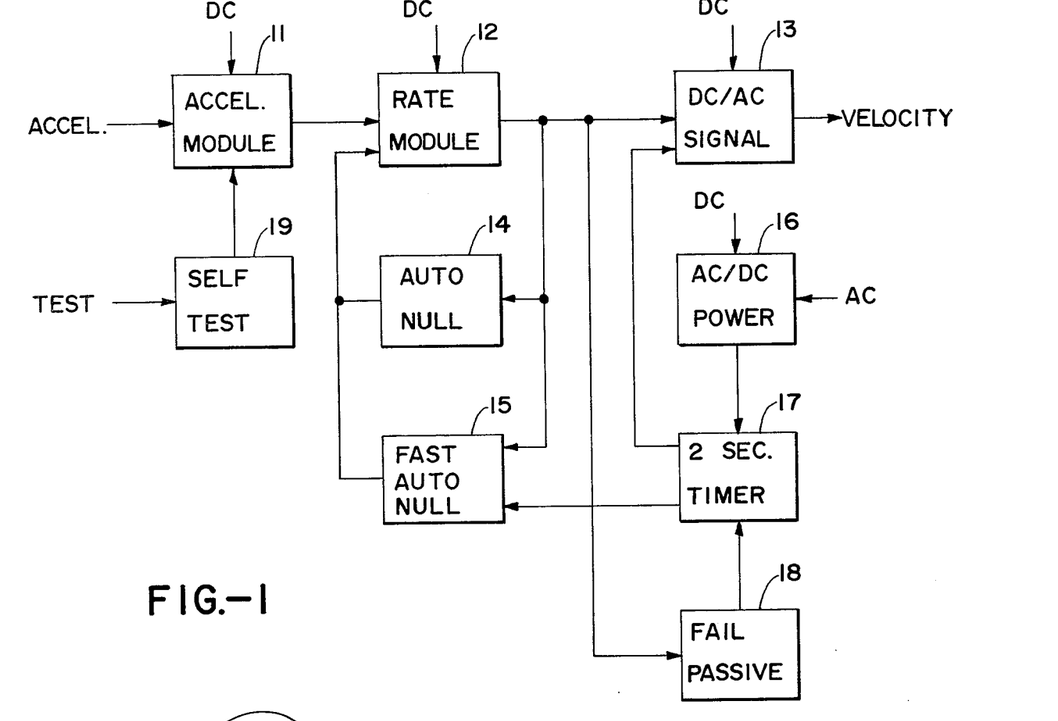
FIG. 1 is a block diagram of the velocity transducer.

The improved velocity transducer provides an instrument which is relatively insensitive to errors induced by fluid thermal gradients normally present within floated instruments, adjacent magnetic fields external of the instruments, and shock and vibration environments applied to the instrument outside case. The external configuration of one embodiment of the transducer allows direct replacement of some conventional spinning rotor angular velocity transducers. Referring to FIG. 1, a block diagram of the improved velocity sensor is shown having an accelerometer section 11 for sensing an acceleration input. A rate module 12 receives output from accelerometer section 11 and provides a signal related to velocity to a DC-to-AC signal inverter 13. Rate module 12 has an automatic nulling circuit 14 in a feedback loop around the rate module 12 and a fast automatic null circuit 15 in a parallel feedback loop around rate module 12. An AC to DC power converter 16 receives AC and DC power and is connected to a timer 17 which in this embodiment provides a 2 second output under certain conditions. A fail-passive circuit 18 monitors the output of rate module 12 and under predetermined conditions provides an output to timer 17 which inhibits DC to AC signal inverter 13. A self test circuit 19 is connected to accelerometer module 11 and is controlled externally.

Figure 2:
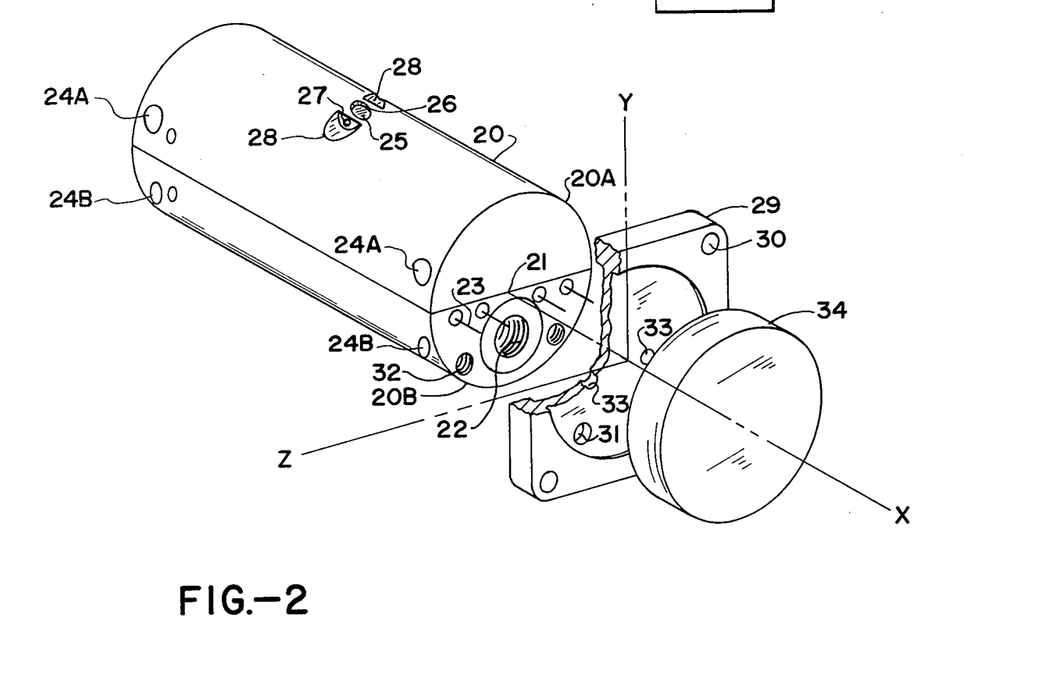
FIG. 2 is an isometric view of the assembled velocity transducer.

FIG. 2 shows the external configuration of the improved velocity transducer having a base member 20 parted along a line 21 forming an upper and lower half 20a and 20b respectively. The lower half 20b of the base member 20 has disposed at each end a bellows 22 which provides for expansion of the internally contained fluid over the operating temperature range. The lower base member 20b also has electrical terminals 23 isolated from the base member 20 and externally accessible on one end for providing electrical power to circuits contained inside base member 20. Holes 24a are shown formed at each of the four corners of the upper base member 20a which provides for clearance of screws (not shown) which enter threaded holes 24b in the lower base member 20b for securing the upper and lower halves of base member 20 together. A fill plug 25 is disposed in a fill hole 26 located in the top of upper base member 20a. Fill plug 25 is safety wired in place following fluid filling by placing wires (not shown) through holes 27 formed in the walls of a pair of cut-outs 28 in upper base members 20a. One configuration of a mounting member 29 is shown in FIG. 2 having mounting holes 30. Clearance holes 31 in mounting member 29 overlie threaded holes 32 in lower base member 20b for receiving screws (not shown) for fastening mounting member 29 to base member 20. Mounting member 29 has additional clearance holes 33 for allowing electrical terminals 23 to pass for connection with an electronics package 34. Mutually perpendicular axes X, Y and Z are shown indexed to the mounting member 29.

Figure 3:
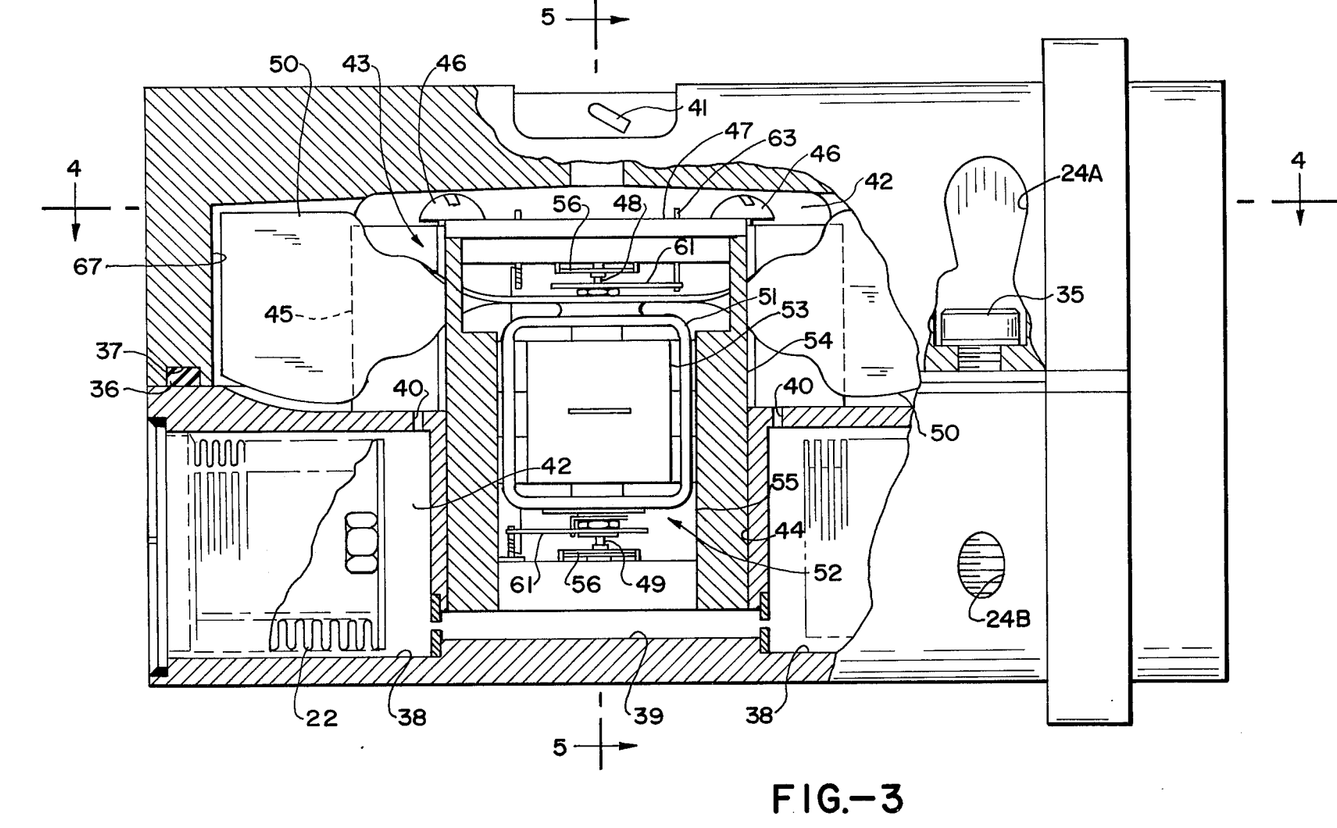
FIG. 3 is a side elevation sectional view of the velocity transducer.

For description of the internal configuration of the improved velocity sensor, reference is made to FIG. 3. The upper and lower halves 20a and 20b of the base member 20 are shown joined together by screws 35 passing through holes 24a to engage threads in threaded holes 24b in the lower base member 20b. An O-ring 36 is disposed in an O-ring groove 37 formed in upper base member 20a at the surface in juxtaposition with the lower base member 20b. Chambers 38 are formed at either end of lower base member 20b to sealably receive bellows 22. A path 39 connects the two chambers 38 and holes 40 extend from chambers 38 to the surface of lower base member 20 in juxtaposition with upper base member 20a. The fill plug 25 is held in place by safety wire 41 which is shown disposed in holes 27. A fluid mass 42 is disposed at the inner surfaces of bellows 22, completely filling all interior volume defined between upper and lower base members 20a and 20b.

A paddle assembly shown generally at 43 is contained in a seismic cradle assembly 47 which is mounted in a bore 44 formed in a boss 45 on the surface of lower base member 20b adjacent to upper base member 20a. Screws 46 retain the seismic cradle assembly 47 in bore 44.

An upper and lower pivot and jewel bearing assembly 48 and 49 respectively supports paddle assembly 43 in the seismic cradle 47. The paddle assembly 43 contains the moving and restoring system which includes a paddle member 50 and a rectangular moving coil 51 that forms a part of a torque motor 52 for applying a restoring torque directly to the paddle member 50. The moving coil 51 is disposed in an air gap formed between a magnet 53 and a cylindrical soft iron shell 54 completely surrounding rectangular moving coil 51 and having internally projecting pole pieces 55.

Figure 5:
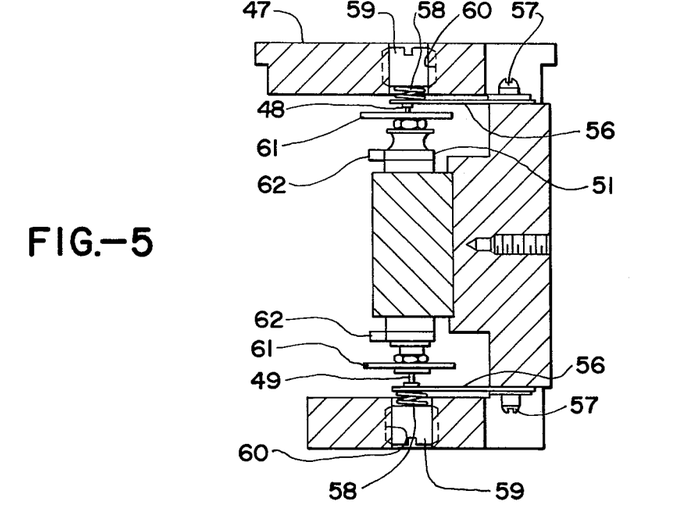
FIG. 5 is a sectional view along the line 5—5 of FIG. 3.

The jewels in the upper and lower pivot and jewel bearing assemblies 48 and 49 are mounted on a leaf spring 56, as best shown in FIG. 5, which is fastened to seismic cradle assembly 47 in a cantilevered fashion by means of screws 57. A coil spring 58 backs up each leaf spring 56 and bears against the back up screw 59 disposed in threaded holes 60 in seismic cradle assembly 47. The pivots in the upper and lower pivot and jewel bearing assemblies 48 and 49 are attached to the paddle assembly. Upper and lower hairsprings 61 are provided at each end of paddle assembly 43 to provide for power connection to the moving coil 51. Balance weights 62 may be applied to the moving coil 51 until paddle assembly 43 is substantially insensitive to linear accelerations in any direction. Balance weights 62 are only utilized in the angular velocity transducer as will be hereinafter explained. Electrical conductors connect hair springs 61 to terminal 63 at the top of seismic cradle assembly 47. Additional electrical conductors 64 connect terminal 63 to terminals 23 mounted in base member 20.

Figure 4:
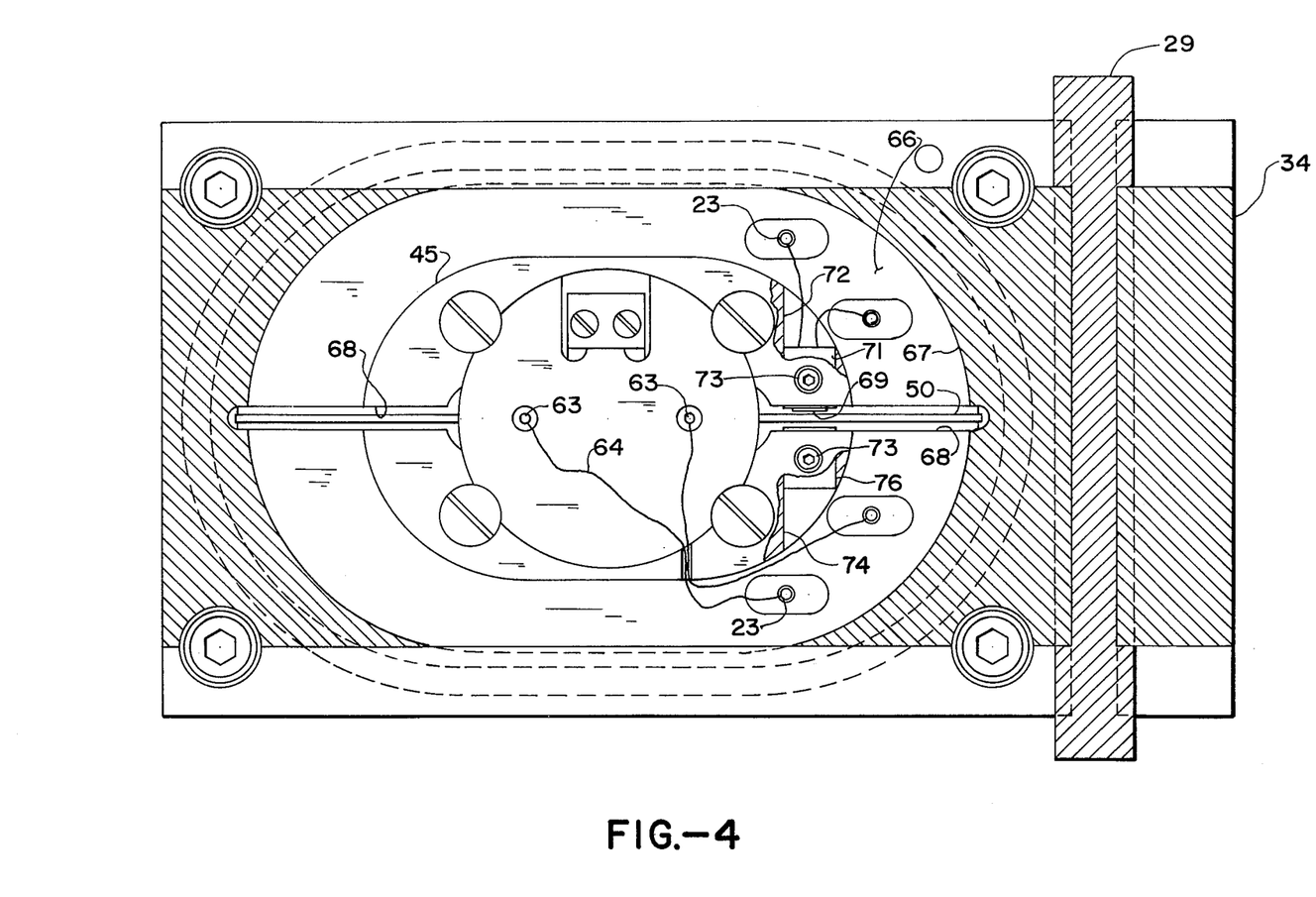
FIG. 4 is a sectional view along the line 4—4 of FIG. 3.

As best seen in FIG. 4 a continuous passageway 66 is formed by internal walls 67 in upper base member 20a and by boss 45 on lower base member 20b. Paddle members 50 extend through slots 68 in boss 45 into passageway 66. Means is provided for sensing the position of the paddle member 50 about the pivot axis and consists of a pick off coil 69 carried by a mounting block 71 disposed in a hole 72 in boss 45. Mounting block 71 is secured in holes 72 by means of a set screw 73. A second hole 74 in boss 45 may mount a dummy pick off block 76 or an additional pick off block 71 carrying a second pick off coil 69. In some applications it may be advantageous to have the second pick off coil 69 mounted in a hole similar to holes 72 or 74 on the opposite side of boss 45 and spaced from the opposite paddle 50. In either event block 71 or 76 is secured in hole 74 by an additional set screw 73.

Electronics module 34 and mounting member 29 are shown mounted in the configuration of FIG. 2. The electronic module 34 may also contain electrical means for receiving AC power input, providing DC power for the transducers, and for receiving the transducer DC output for converting it into an AC output substantially in phase with the AC power input over the operating temperature range.

Figure 6:
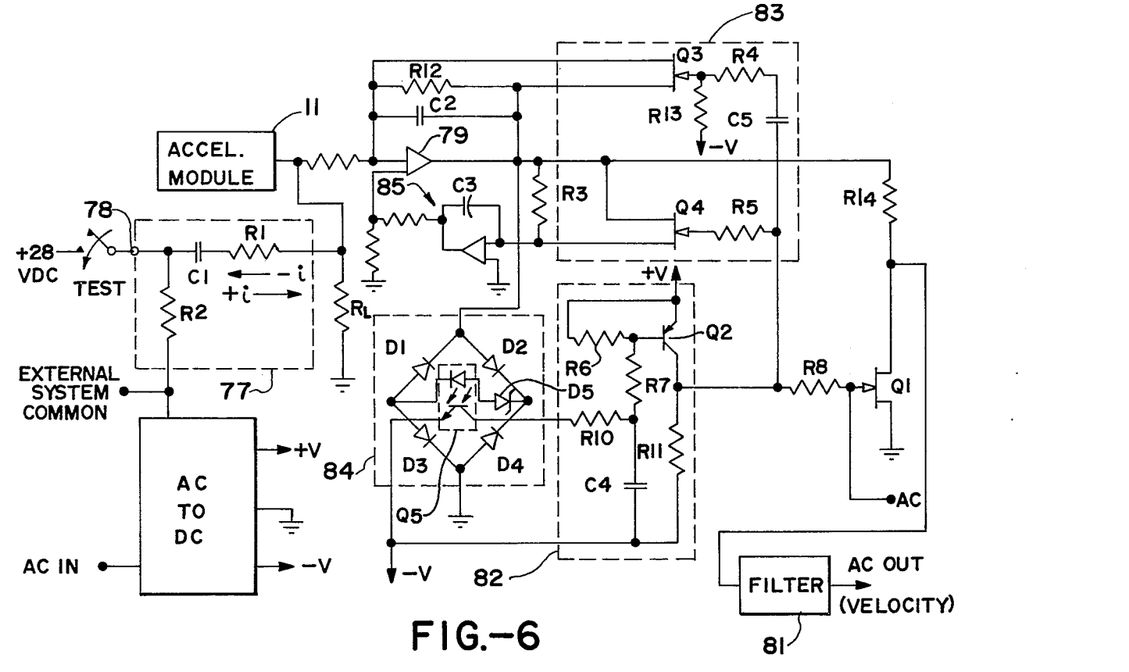
FIG. 6 is an electrical schematic showing interrelation between the fast automatic null circuit, the output inhibit circuit, the timer circuit, and the self test circuit.

Referring to FIG. 6 certain specific features of the electrical circuitry contained in module 34 and base member 20 will now be described. The acceleration sensing module 11 provides a signal related to acceleration which is connected to a load $R_L$. A self-test circuit 77 having an externally accessible terminal 78 is connected to the load $R_L$. The self-test circuit includes a capacitor C1 connected in series with a resistor R1 which is connected to the output side of $R_L$. A resistor R2 is connected between terminal 78 and external system common.

The output of the acceleration module is also sent to the input of the rate module 12. Pertinent portions of the rate module circuit are shown which includes an integrator 79 having parallel feedback paths containing R12 and C2. The output of integrator 79 provides a signal related to velocity which may be sent to a filter 81 contained in electronics package 34. The output from integrator 79 has a pass band limited at the high frequency end by the mechanical response of acceleration module 11 and the electrical characteristics of the module output circuitry. The pass band is limited at the low frequency end by the electrical characteristics of the integrator 79.

A timer 82 is included which is connected through a resistor R8 to the gate of a chopper field effect transistor Q1. A transistor Q2 has a bias resistor R6 between emitter and base and a resistor R7 from the base through capacitor C4 to the negative supply voltage −V. A resistor R11 is connected from the collector of Q2 to the negative supply −V. Voltage is placed on the emitter of Q2 at turn on.

A fast automatic null circuit 83 receives the output from timer circuit 82. A resistor R3 is in an automatic nulling feedback loop shown at 85. A pair of field effect transistors (FET) Q3 and Q4 have their sources and drains connected across integrator feedback capacitor C2 and the resistor R3, respectively. The output from timer circuit 82 is connected through resistor R4 and R5 to the gates of FET's Q3 and Q4. Capacitor C5 is located between R4 and R5. R13 ensures that Q3 transistor is normally off.

A fail passive circuit 84 is a four leg bridge having a diode D1 through D4 in each leg. The velocity signal from integrator 79 is connected to one terminal of the bridge and the opposite side is at signal ground. The intermediate bridge terminals have a light emitting diode connected therebetween in series with a Zener diode D5, such light emitting diode acting as a light source for photo transistor Q5.

Turning to the operation of the velocity transducer, the angular velocity sensor will be functionally described. The angular velocity transducer is sensitive about the Y axis of FIG. 2. Sensitivity about this axis relative to the base member 20 provides an angular velocity sensor, or rate sensor, which is interchangeable with spinning rotor type rate gyros now in service in a wide variety of applications. With initial angular velocity about the Y axis serving as a zero reference a change in angular velocity may only occur in the presence of an angular acceleration by definition. The Y axis in FIG. 2 is parallel to the axis of rotation of the fluid mass 42 in the continuous passageway, or annular flow path 66. When the base member 20 is subjected to angular acceleration about the sensitive Y axis, a positive error signal is generated by the accelerometer as the fluid rotor 42, due to its inertia, tends to lag behind the accelerating base member 20. The paddle member 50 disposed in the annular passageway 66 serves to constrain the fluid mass 42 and to cause it to move with the base member 20. As soon as the fluid mass 42 causes slight movement of the paddle member 50 the movement is sensed by pick off coil 69, as explained in copending patent application for "Bias and Scale Factor Temperature Compensation Network", Ser. No. 307,109 filed Nov. 16, 1972. The variation in spacing between the paddle member 50 and the pick off coil 69 modulates the output amplitude which is detected and changed to a high level signal. A signal is supplied to the moving coil 51 to restore the paddle member 50 to its zero or null position, thus causing the fluid mass 42 to move in synchronism with the base member 20. The electrical current flowing into the moving coil 51 is thereby related to the acceleration to which the fluid mass 42 is subjected. Thus, the fluid mass 42 serves as the inertial mass in the accelerometer and is closely coupled to the low inertia torque motor 52. Torque motor 52 operates in a closed-loop fashion to sense the angular motion of the fluid mass 42 and to provide the torque necessary to constrain the mass 42 to move with the base member 20.

The torque motor 52 has a centrally disposed magnet 53 and an air gap for the moving coil 51 formed between the magnet 53 and the soft iron cylindrical shell 54 which completely surrounds magnet 53 and moving coil 51. The cylindrical shell 54 has inwardly extending pole pieces 55 to create as narrow an air gap as possible between them and magnet 53. The remainder of cylindrical shell 54 functions as a return flux path for the torque motor 52 and also serves to shield torque motor 52 from any noise signals which might be generated within the moving coil 51 by stray lines of flux from external magnetic fields.

Leaf springs 56, as best seen in FIG. 5, provide some compliance for the paddle assembly 43 along the Y axis. Coil springs 58 and back up screws 59 provide a preload adjustment for the upper and lower pivot and jewel bearing assemblies 48 and 49. Leaf springs 56 stabilize the pivots and jewels, minimizing disturbance from shock and vibration to which the base member 20 is subjected.

Balance weights 62 on moving coil 51 are installed while the paddle member 50 is mounted within seismic cradle assembly 47 and after pivot and jewel assemblies 48 and 49 have been finally adjusted. Balance of the paddle member 50 within the fluid mass 42 reduces sensitivity to linear acceleration to a low level heretofore not obtainable.

The continuous passageway or annular flow path 66 is formed of walls 67 within the upper and lower base member 20a and 20b. Base members 20a and 20b are relatively massive parts and provide for ready heat conduction from any portion of the base member 20 to all other portions. Thus, the walls 67 of the annular flow path 66 are substantially the same temperature at any point. Since there is substantially no temperature differential internally of the base member 20, no temperature gradient can exist within the fluid mass 42 which is in direct contact with base member 20. There are no thermal currents set up within fluid mass 42 which would tend to cause motion of paddle member 50. Therefore, the output signal is substantially free of errors induced by thermal currents within the fluid mass 42. Moreover, paddle members 50 are completely contained within the walls of annular path 66 and are therefore subject only to motion of the fluid mass 42 within the path 66.

Electronics package 34 contains AC to DC power converter 16 receiving AC input power. The AC power input is converted by conventional means to DC power and supplied to the electronics described above for energizing the pick off coil 69 and torque motor 52. The output related to angular annular rate from rate module 12 is chopped and formed into a sine wave by a conventional circuit providing an output which is synchronized with the AC power input. Therefore, the normal phase shift relative to the input phase experienced in the normal AC pick off device is substantially eliminated. Change in phase shift as a function of operating temperature over wide temperature ranges is also substantially eliminated. By way of example such phase shift stability has been maintained over the range of −50°C to +90°C. The magnitude of phase shift compensation is limited only by the quality and type of passive components used; e.g. using metal film resistors with low temperature coefficients gives improved performance if they replace carbon resistors with high temperature coefficients.

The circuit of FIG. 6 shows those sections which are necessary to a description of the improved velocity sensor disclosed herein. At the time power is turned on to the velocity transducer, voltages +V and −V are placed on the emitter and collector, respectively, of transistor Q2 in timer circuit 82. Fast automatic true null is obtained as follows: capacitor C4 charges through resistors R6 and R7 providing a bias voltage low enough at the base of Q2 to cause conduction thorugh Q2 and R11 to −V. This places +V at the collector of Q2 which is connected to the gates of Q3 and Q4 in fast auto null circuit 83 causing them to conduct. C2 and R3 introduce relatively long time constants in integration performed by integrator 79 and automatic nulling performed by feedback loop 85. C2 and R3 are thereby short circuited for the time determined by circuit 82 which removes the time delay components C2 and R3 long enough for the circuit to quickly null out DC signals at the output of integrator 79. Q3 is turned on through the differentiating coupling network C5, R4 and R13 for a short time, typically 0.2 seconds. The timer circuit 82 is typically set to provide a 2 second conduction at Q2 by choosing R6, R7 and C4 properly, turning on Q4 for a like interval of time. Timer circuit 82 also turns on Q1, simultaneously inhibiting production of an output signal.

Means are provided in the integrator for preventing saturation of the integrator output in the absence of velocity applied to the base member. As may be seen from the circuit of FIG. 6, a steady state input to integrator 79 from acceleration module 11 will provide an ever increasing output from integrator 79. The long time constant introduced in the integration simply slows the output signal response resulting from an input signal arriving from acceleration module 11. A low level steady state signal, such as a bias error signal, from acceleration module 11 will provide therefore, a relatively slow response increasing output from integrator 79. This slow response signal may be seen to be fed back through R3 and automatic nulling feedback loop 85 to the other input polarity of integrator 79, thereby cancelling the steady state input signal. Since the auto null feedback loop is also a relatively slow response circuit, as determined by the magnitude of R3, inputs to integrator 69 having frequencies above a predetermined frequency as determined by R3 and C2, will produce output from integrator 79 which will be presented as system output as described above, before the relatively slow response auto null feedback loop 85 is able to produce a cancelling signal.

Fail passive circuit 84 monitors the output related to velocity from integrator 79. Any time a signal greater than a predetermined value referenced to signal ground appears at the output of integrator 79, a switch such as photo transistor Q5 is actuated as follows: A voltage at the output of integrator 79 more negative than the sum of the forward voltage drops of D4 and D1 and the Zener voltage of D5 will complete a circuit through the light emitting diode associated with Q5, serving to turn on Q5. An integrator output higher than the sum of the forward voltage drops of D2 and D3 plus the Zener voltage of D5 will also excite the light emitting diode turning on Q5. When Q5 is turned on C4 is shorted and current is drawn through R6, R7 and R10 to −V dropping the base voltage of Q2 to a point to bias Q2 to a conducting condition. The DC voltage +V is placed on the gate of Q1 turning it continuously on. Since the DC output from integrator 79 is no longer chopped by Q1 and the output is transformer coupled, the transducer output is inhibited.

Figure 7:
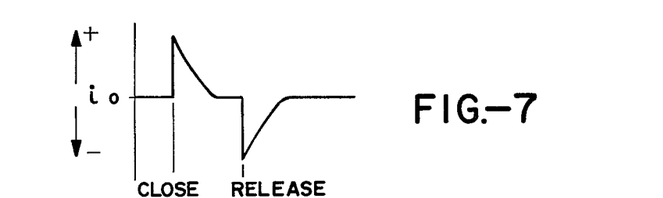
FIG. 7 is a self test current diagram.

The self-test circuit 77 is connected to the top of $R_L$. An external test switch is connected between terminal 78 and a DC test voltage, +28VDC in this embodiment. When the test switch is closed a positive current pulse related to a predetermined acceleration for a predetermined time, as seen in FIG. 7, is directed through the load $R_L$. When the test switch is released a negative current pulse as seen in FIG. 7 is directed through the load $R_L$. The integrator 79 integrates the consequent load voltage change the same as it would an output from acceleration module 11. Thus, a predictable rate or velocity output indicative of normal operation is produced by the transducer having one polarity for closing the external test switch and the opposite polarity for opening the switch. The magnitude of the test velocity output is predetermined by the values of C1, R1 and the test voltage.

The angular rate sensor described above may be modified into a linear velocity transducer by rendering the paddle member 50 pendulous. The balancing operation utilizing balancing weights 62 on moving coil 51 is eliminated and a certain degree of pendulosity in paddle assembly 43 is intentionally imposed. Baffling is also installed in continuous passageway 66 to remove the tendency for fluid mass 42 to display inertial properties about the Y axis of FIG. 2 independent of the base member 20.

In the linear velocity configuration all components operate as described above with the exception of paddle assembly 43 and the fluid mass 42. In the linear velocity transducer modification, paddle assembly 43 serves as the inertial mass instead of fluid mass 42. Fluid mass 42 serves as a flotation medium and a damping medium only. As shown in FIG. 2, a component of linear velocity along the Z axis is sensed. As described above the linear velocity sensor may function with or without the AC power input and AC signal output circuitry, or the self-test 77, fast auto null 83, timer 82, or fail passive circuit 84.

A velocity transducer has been disclosed which is substantially free from errors induced by internal thermal gradients, external magnetic fields, or environmental shock and vibration loads, and which may be used with slight modification to sense angular or linear velocity. Immediate operating capability after turn-on, as well as self test, and fail passive features have been shown.

We claim:

1. In combination with a velocity sensor of the type having a base member, a pickoff mounted on the base member, a fluid mass disposed for movement relative to the base member, a paddle assembly mounted within the base member having a paddle member in juxtaposition with said pickoff, said paddle member being pivotally mounted and in communication with the fluid mass, first electrical means connected to the pickoff for producing torque for retaining the paddle member in a predetermined position relative to the base member and for providing a first electrical output related to movement of the paddle member relative to the pickoff, second electrical means including a feedback capacitor for integrating the first electrical output and providing a second electrical output related to the velocity of the base relative to a predetermined axis, the second electrical output having a pass band limited at high frequency by the first electrical means, and limited at low frequency by the second electrical means, the improvement which comprises an automatic nulling feedback loop connected around the second electrical means for cancelling steady state signals at the input of the second electrical means, means for guiding the fluid mass within a closed path formed integrally with the base member, leaf spring pivot supports disposed within the paddle assembly for supporting the paddle member, whereby the pivotally mounted paddle assembly is stabilized from shock and vibration loads, and means for providing a return flux path completely surrounding the first electrical means, whereby the first electrical output is shielded from induced electrical noise from stray magnetic flux.

2. A combination with a velocity sensor as in claim 1 together with a third electrical means for receiving AC power input and the second electrical output and for providing a third electrical output related to the second electrical output which is AC, said third electrical output being substantially in phase with said AC power input over operating temperature ranges of −50°C to +90°C.

3. A combination with a velocity sensor as in claim 2 together with means for monitoring the second electrical output, a switch actuated by said means for monitoring when the second electrical output exceeds a predetermined level, and means for inhibiting said third electrical output responsive to actuation of said switch.

4. A combination with a velocity sensor as in claim 2 wherein said automatic nulling feedback loop has a component establishing a long time constant, together with a timer circuit actuated each time the power to the velocity sensor is turned on, means for short circuiting the feedback capacitor associated with the second electrical means and the component establishing a long time constant, said means for short circuiting being activated by said timer circuit, thereby obtaining a substantially true null at the second electrical output within the period of said timer circuit, means for monitoring the second electrical output, a switch actuated by said means for monitoring when the second electrical output exceeds a predetermined level, means for inhibiting said third electrical output responsive to actuation of said switch, means for testing the velocity sensor connected to the first electrical output, said means for testing introducing a signal related to a predetermined acceleration for a predetermined time, whereby a predetermined output indicative of normal velocity sensor operation is produced without subjecting the base member to velocity inputs.

5. A combination with a velocity sensor as in claim 1 together with means for balancing the paddle member about the pivot axis in the fluid mass to remove paddle member sensitivity to linear acceleration, and wherein said means for guiding the fluid mass is a continuous annular path formed by walls within the base member and wherein the paddle member is contained within the walls of said annular path, whereby the velocity sensor provides the second electrical output responsive to angular velocity about a predetermined sensitive axis perpendicular to the plane containing the axis of said annular path.

6. A combination with a sensor as in claim 5 wherein the base member is a right circular cylinder and wherein the plane containing the axis of said annular path is parallel to the axis of said right circular cylinder.

7. A combination with a velocity sensor as in claim 1 wherein the paddle member is pendulous and wherein said means for containing the fluid mass is a channel formed by walls within the base member, and wherein the paddle member is oriented with its broad surface substantially perpendicular to the longitudinal axis of said channel within the walls of said channel, whereby the second electrical output is responsive to linear velocity along an axis perpendicular to the axis of pendulosity and parallel to the longitudinal axis of said channel.

8. A combination with a velocity sensor as in claim 1 wherein said automatic nulling feedback loop has a component establishing a long time constant, together with a timer circuit, and means for short circuiting the feedback capacitor associated with the second electrical means and the component establishing a long time constant, said means for short circuiting being activated by said timer circuit, whereby the second electrical output null is reached within the period of said timer circuit.

9. A combination with a velocity sensor as in claim 1 together with means for testing the velocity sensor connected to the first electrical output, said means for testing introducing a signal related to a predetermined acceleration for a predetermined time, whereby the velocity sensor produces a predictable output indicative of normal operation without subjecting the base member to velocity inputs.

10. A combination as in claim 1 wherein the base provides for ready heat conduction and wherein said closed path has a volume which is small relative to the volume of the base, whereby said means for guiding the fluid mass is at substantially the same temperature throughout so that said fluid mass is at substantially one temperature, thereby eliminating thermal currents due to fluid density differential therein.

11. A velocity transducer comprising a base member having internal walls forming a closed channel and being heat conductive, a fluid mass disposed within said closed channel, said fluid mass being smaller than the mass of said base member, whereby said fluid mass is stabilized throughout at the temperature of said base member, a paddle assembly mounted within said base member, leaf spring pivot supports disposed within said paddle assembly, a paddle member mounted on said pivot supports for pivotal motion within said paddle assembly, whereby said pivot supports are stabilized thereby minimizing disturbance from shock and vibration loads, said paddle member extending into said closed channel with the broad surfaces of said paddle member substantially perpendicular to the longitudinal axis of said closed channel, first electrical means for retaining said paddle member in a predetermined position relative to said base member and providing a first electrical output related to movement of the paddle member, means for providing a return flux path completely surrounding said first electrical means for completing the magnetic circuit for retaining said paddle member and for shielding said first electrical output from induced electrical noise from stray magnetic flux, second electrical means including a feedback capacitor for integrating said first electrical output and providing a second electrical output related to base member velocities having a predetermined directional sense, an automatic nulling feedback loop connected around said second electrical means for cancelling steady state signals at the input of the second electrical means, said second electrical output having a pass band limited at high frequency by the mechanical response of said paddle assembly and the electrical characteristics of said first electrical means, and limited at low frequency by the electrical characteristics of said second electrical means.

12. A velocity transducer as in claim 11 together with a third electrical means for receiving an AC power input and said second electrical output and for providing a third electrical output which is AC, related to the velocity of said base member, said third electrical output being substantially in phase with said AC power input over operating temperature ranges of −50°C. to +90°C.

13. A velocity transducer as in claim 12 together with means for monitoring the second electrical output, a switch actuated by said means for monitoring when the second electrical output exceeds a predetermined level, and means for inhibiting said third electrical output responsive to actuation of said switch.

14. A velocity transducer as in claim 12 together with means included in said automatic nulling circuit for introducing a long time constant therein, a timer circuit actuated each time the power to the velocity sensor is turned on, means for short circuiting the feedback capacitor and the means for introducing a long time constant activated by said timer circuit, thereby obtaining a substantially true null at the second electrical output within the period of said timer circuit, means for monitoring the second electrical output, a switch actuated by said means for monitoring when the second electrical output exceeds a predetermined level, means for inhibiting said third electrical output responsive to actuation of said switch, means for testing the velocity sensor connected to the first electrical output, said means for testing introducing a signal related to a predetermined acceleration for a predetermined time, whereby a predetermined output indicative of normal velocity sensor operation is produced without subjecting the base member to velocity inputs.

15. A velocity transducer as in claim 11 together with means for balancing said paddle member about the pivot axis in said fluid mass to remove paddle member sensitivity to linear acceleration, and wherein said closed channel is a continuous annular path, whereby the velocity sensor provides said second electrical output responsive to angular velocity about a predetermined sensitive axis perpendicular to the plane containing the axis of said annular path.

16. A velocity transducer as in claim 15 wherein said base member has an external configuration in the form of a right circular cylinder, and wherein the cylindrical axis of said cylinder is perpendicular to said sensitive axis.

17. A velocity transducer as in claim 11 wherein said paddle member is pendulous whereby the velocity sensor provides said second electrical output responsive to linear velocity along an axis perpendicular to the surface of said paddle member.

18. A velocity transducer as in claim 11 together with a timer circuit, means included in said automatic nulling circuit for introducing a long time constant, and means for short circuiting said feedback capacitor and said means for introducing a long time constant activated by said timer circuit, whereby the second electrical output null is reached within the period of said timer circuit.

19. A velocity transducer as in claim 11 together with means for testing the velocity sensor connected to the first electrical output, said means for testing introducing a signal related to a predetermined acceleration for a predetermined time, whereby the velocity sensor produces a predictable output indicative of normal operation without subjecting the base member to velocity inputs.

20. A velocity transducer comprising a base member having a closed channel formed therein, a fluid mass disposed in said closed channel, means for detecting relative motion between said base member and said fluid mass producing a first electrical output signal, an integrator for receiving said first electrical output at one of a plurality of input terminals and producing a second electrical output signal, an automatic nulling circuit for connection between said second electrical output and another one of said plurality of input terminals, said automatic nulling circuit operating to cancel first electrical output signals at frequencies below a predetermined frequency, whereby said second electrical output signal is free of steady state error in said first electrical output signal.

21. A velocity transducer as in claim 20 wherein said means for detecting relative motion between said base member and said fluid mass is responsive to angular accelerations of said base only, and said closed channel is a continuous annular path, whereby said second electrical output signal is indicative of angular velocity about an axis perpendicular to the plane containing the axis of said annular path.

22. A velocity transducer as in claim 20 wherein said means for detecting relative motion between said base and said fluid mass includes a pendulous member disposed in said fluid mass, whereby said second electrical output signal is indicative of linear velocity along an axis perpendicular to the axis of pendulosity.

23. A velocity transducer as in claim 20 together with a timer circuit, means included in said automatic nulling circuit for introducing a long time constant, and means for short circuiting said feedback capacitor and said means for introducing a long time constant activated by said timer circuit, whereby the second electrical output null is reached within the period of said timer circuit.

24. A velocity transducer as in claim 20 together with a third electrical means for receiving an AC power input and said second electrical output and for providing a third electrical output which is AC, related to the velocity of said base member, said third electrical output being substantially in phase with said AC power input over operating temperature ranges of −50°C. to +90°C.

25. A velocity transducer as in claim 24 together with means for monitoring the second electrical output, a switch actuated by said means for monitoring when the second electrical output exceeds a predetermined level, and means for inhibiting said third electrical output responsive to actuation of said switch.

26. A velocity transducer as in claim 20 together with means for testing the velocity sensor connected to the first electrical output, said means for testing introducing a signal related to a predetermined acceleration for a predetermined time, whereby the velocity sensor produces a predictable output indicative of normal operation without subjecting the base member to velocity inputs.

* * * * *